(12) United States Patent
Kirshenbaum

(10) Patent No.: US 6,378,117 B1
(45) Date of Patent: Apr. 23, 2002

(54) CELLULAR ENCODING USING TYPED DEVELOPMENT OPERATORS

(75) Inventor: Evan R. Kirshenbaum, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/385,131

(22) Filed: Aug. 27, 1999

(51) Int. Cl.$^7$ .......................... G06F 17/50; G06F 17/10

(52) U.S. Cl. ...................... 716/8; 716/7; 716/2; 703/1; 703/2; 703/14

(58) Field of Search ........................... 716/1–21; 703/2, 703/13–19

(56) References Cited

U.S. PATENT DOCUMENTS 5,760,786 A * 6/1998 Marks et al. ................ 345/441
5,867,397 A * 2/1999 Koza et al. ................... 703/14

FOREIGN PATENT DOCUMENTS

JP          08272659 A  * 10/1996 ........... G06F/12/00

OTHER PUBLICATIONS

Tanomaru et al. ("An evolutionary method for automatic wire routing", 20th International Conference on Industrial Electronics, Control and Instrumentation, 1994, IECON '94, vol. 2, Sep. 5, 1994, pp. 1117–1122).*

Gruau ("Cellular encoding as a graph grammar", IEE Colloquium on Grammatical Interference: Theory, Applications and Alternatives, 1993, pp. 17/1–10).*

Hussain et al. ("Network generating attribute grammar encoding", The 1998 IEEE International Joint Conference on Neural Networks Proceedings, vol. 1, May 4, 1998, pp. 431–436).*

* cited by examiner

*Primary Examiner*—Matthew Smith
*Assistant Examiner*—Phallaka Kik

(57) ABSTRACT

Cellular encoding using typed development operators in which basic types are determined for the basic components of a structure being developed. Each development operator for developing the structure is associated with one or more of the basic types. Organisms are generated using tree arrangements of the development operators by matching the basic types associated with connections among the development operators in the trees. The matching among typed development operators reduces the likelihood of creating unfit organisms. Cellular encoding with typed development operators may also be used to evolve the structure.

13 Claims, 9 Drawing Sheets

CELLULAR ENCODING USING TYPED DEVELOPMENT OPERATORS

BACKGROUND OF THE INVENTION

Field of Invention

The present invention pertains to the field of cellular encoding. More particularly, this invention relates to cellular encoding using typed development operators.

Art Background

Cellular encoding may be used to develop a variety of structures including electrical circuits and finite automata. A typical prior cellular encoding process generates organisms which represent putative solutions to the problem of developing a desired structure. For example, an organism may be a program for generating an electrical circuit having a set of desired properties from an embryo circuit element. The properties may include desired signal outputs in response to signal inputs.

An organism in cellular encoding is commonly represented as a tree which provides an arrangement of development operators. Each development operator typically replaces a piece of a structure with zero or more other pieces. Typically, each new piece may continue to develop according to the child development operators specified by the tree.

Cellular encoding is typically used with genetic programming to evolve a desire structure. Genetic programming may be defined as a computer-based programming methodology in which computer programs are generated using an iterative process that simulates evolution by natural selection. In the case of cellular encoding, the computer programs generated are programs for developing a desired structure such as an electrical circuit or finite state machine from an embryonic structure.

Genetic programming typically involves the generation of an initial population of organisms. Each organism in the population is typically evaluated as a solution to the particular development problem using a fitness measure. In the example of circuit construction, the fitness measure for an organism may be based on an analysis of the properties of an electrical circuit which is developed by the organism. If a solution developed by an organism in a population is considered good enough in terms of the fitness measure, then it is usually selected as the solution to the particular problem. Otherwise, a subset of the organisms from the population are typically selected to become parents for a population of child organisms.

Child organisms are typically created by combining parent organisms using techniques that are modeled on biological processes such as mutation and crossover. The organisms in the child population are then evaluated as solutions using the fitness measure. The process repeats through generations of child populations until an individual organism that is good enough is found or until it is decided that the process has gone on sufficiently long that it is not worth proceeding.

In prior cellular encoding methods, development operators in a tree usually operate on only one type of structural element. In addition, prior cellular encoding methods typically impose the requirement that any development operator in a tree must accept the ouput of any other development operator in the tree. Typically, this yields an extremely wide range of possible interconnections of development operators in trees. This large number of possible interconnections usually increases the number of organisms that must be evaluated as possible solutions to a particular problem. Unfortunately, this typically slows convergence to a solution thereby increasing the time and cost required to evolve a desired structure.

SUMMARY OF THE INVENTION

Cellular encoding techniques using typed development operators are disclosed in which basic types are determined for the components of a structure being developed. Each development operator for developing the structure is associated with one or more of the basic types. Organisms are generated using tree arrangements of the development operators by matching the basic types associated with connections among the development operators in the trees. The matching among typed development operators reduces the likelihood of creating an unfit organism.

Cellular encoding using typed development operators may be used in conjunction with genetic programming to evolve the structure. For example, a population of organisms having typed development operators may be generated and a set of parent organisms may be selected from the population based on their fitness in generating the structure. A set of child organisms may then be generated by combining portions of the parent organisms such that connections among the development operators in the child organisms match the associated basic types. The type matching reduces the likelihood of creating unfit child organisms, thereby increasing the likelihood and speed of convergence to a solution.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
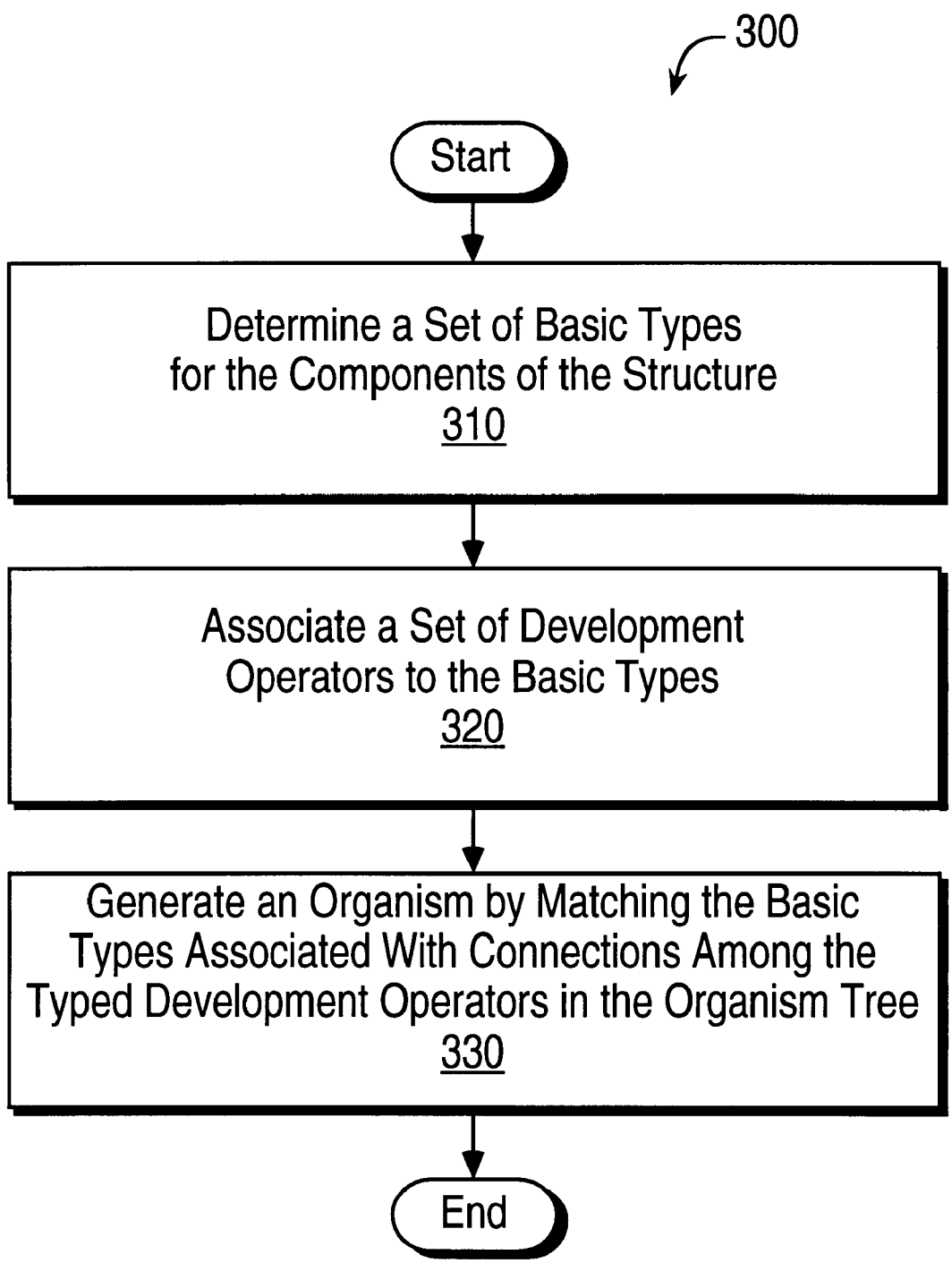
FIG. 1 illustrates a method for developing a structure using cellular encoding with typed development operators.

FIG. 1 illustrates a method 300 for developing a structure using cellular encoding with typed development operators. The structure developed may be a graph structure, a finite state machine, a neural network, a Baysian network, a directed acyclic graph, an electrical circuit, or mechanical or chemical systems, to name a few examples. Any structure capable of being developed using cellular encoding may be developed using the method 300.

At step 310, the structure is analyzed to determine a set of basic types for the components of the structure. The basic types determined at step 310 depend on the structure itself. The basic types generally include a set of basic component types. The basic types may also include a set of basic parameter types for the parameters associated with the components.

For example, a directed acyclic graph may be viewed as an arrangement of nodes and arcs with each node having an associated color and each arc having an associated length. Therefore, the basic component types in a directed acyclic graph include a basic node type for the nodes in the structure and a basic arc type for the arcs in the structure. The basic parameter types of a directed acyclic graph include a color type for the colors of the nodes and a number type for the lengths of the arcs.

As another example, an electrical circuit may be viewed as an arrangement of wires and resistors and capacitors and transistors, etc., with associated resistance values, capacitance values, and transistor values. The basic component types of such an electrical circuit include a basic wire type, a basic resistor type, a basic capacitor type, and a basic transistor type, etc. The basic parameter types also include number types for resistance and capacitance values, etc.

The basic component types determined at step 310 may be arranged in a hierarchy. For example, the components in an electrical circuit may include a basic wire type, a basic resistor type, and a basic capacitor type, where the basic capacitor and resistor types are sub types of the basic wire type. Similarly, the basic parameter types determined at step 310 may be arranged in a hierarchy. For example, the basic number type may include a real number type and a complex number type which are sub types of the basic number type.

At step 320, each of a set of development operators for developing the structure is associated with one or more of the basic types determined at step 310. As a consequence of this association between development operators and basic types, the development operators may be referred to as typed development operators. In the directed acyclic graph example, one or more development operators may be associated with the basic node type and one or more development operators may be associated with the basic arc type. The development-operators that are associated with the basic. node type are said to be typed for the development of nodes and the development operators that are associated with the basic arc type are said to be typed for the development of arcs.

A typed development operator may specify one or more child development operators for further developing the structure. Each specified child development operator is associated with one of basic types determined at step 310. In the directed acyclic graph example, a development operator that is typed for the development of the basic node type may specify one child operator that is typed for the development of the basic node type and one child operator that is typed for the development of the basic arc type. In the electrical circuit example, a development operator that is typed for the development of the wire type may specify one child operator that is typed for the development of the resistor type.

In addition, one or more of the typed development operators may take one or more arguments. Each argument is associated with one of basic types determined at step 310. In the directed acyclic graph example, a development operator that is typed for the development of the basic node type may take one argument that is typed for the basic color type.

At step 330, an organism having a tree arrangement of typed development operators is generated by matching the basic types associated with connections among the development operators in the tree. In the directed acyclic graph example, a development operator that specifies a child operator that is typed for the development of the basic node type is type matched if connected to a development operator that is typed for the basic node type but not if connected to a development operator that is typed for the basic arc type or the basic color type.

The arrangement of typed development operators in an organism defines a program for developing a structure from an embryo structure. An organism is generated at step 330 so that each typed development operator in the organism operates on a component in the structure of the appropriate basic type. In the directed acyclic graph example, development operators that are typed for node components are arranged so that they operate only on node components and development operators that are typed for arc components are arranged so that they operate only on arc components. Each development operator under control of its parameters modifies or adds new components or replicates components. Each modified or new or replicated component is then further developed under control of the child operators of the development operators that created them.

The following description focuses on an example in which the structure being developed using the method 300 is a graph. The graph is made up of nodes and arcs and its basic component types determined at step 310 include a basic node type (NODE_TYPE) and a basic arc type (ARC_TYPE). The nodes have colors and the arcs have lengths and the basic parameter types determined at step 310 include a color type (COLOR_TYPE) and a number type (NUMBER_TYPE).

The typed development operators in this example include a SPLIT operator, a GROW operator, a LENGTH operator, a COLOR operator, and a REVERSE operator. The SPLIT, GROW, and COLOR operators are each used to develop the NODE_TYPE and are each typed as DEV_NODE_TYPE at step 320. The LENGTH and REVERSE operators are each used to develop the ARC_TYPE and are each typed as DEV_ARC_TYPE at step 320.

The typed development operators in this example also include a RED operator, a GREEN operator, and a BLUE operator. The RED, GREEN, and BLUE operators provide values of the COLOR_TYPE which can be used as parameters to the COLOR operator thereby determining the behavior of the COLOR operator. Sub tree structures may be used to specify any arbitrary expression for an argument to the COLOR operator so long as the expression evaluates to the COLOR_TYPE.

The typed development operators in this example also include a VALUE=x operator. The VALUE=x operator provides a value of the NUMBER_TYPE which can be used as a parameter to the LENGTH operator thereby determining the behavior of the LENGTH operator. Sub tree structures may be used to specify any arbitrary expression for an argument to the LENGTH operator so long as the expression evaluates to the NUMBER_TYPE.

The SPLIT operator replaces a given node with a first node and a second node with an arc in between the first and second nodes. The first node has all of the inputs of the given node and the second node has all of the outputs of the given node. The SPLIT operator has three child operators a first of which is typed DEV_NODE_TYPE, a second of which is typed DEV_ARC_TYPE, and a third of which is typed DEV_NODE TYPE.

The GROW operator acts on a given node and generates a child node with an arc in between the given node and the child node. The given node retains all of its inputs and outputs. The GROW operator has three child operators a first of which is typed DEV_NODE_TYPE, a second of which is typed DEV ARC_TYPE, and a third of which is typed DEV_NODE_TYPE.

The LENGTH operator assigns a length to an arc and ceases further development. The LENGTH operator has one child operator which is typed NUMBER_TYPE and which provides an argument of NUMBER_TYPE.

The COLOR operator assigns a color to a node and ceases further development. The COLOR operator has one child operator which is typed COLOR_TYPE and which provides an argument of COLOR_TYPE.

The REVERSE operator reverses the direction of an arc. The REVERSE operator has one child operator which is typed DEV_ARC_TYPE.

Figure 2:
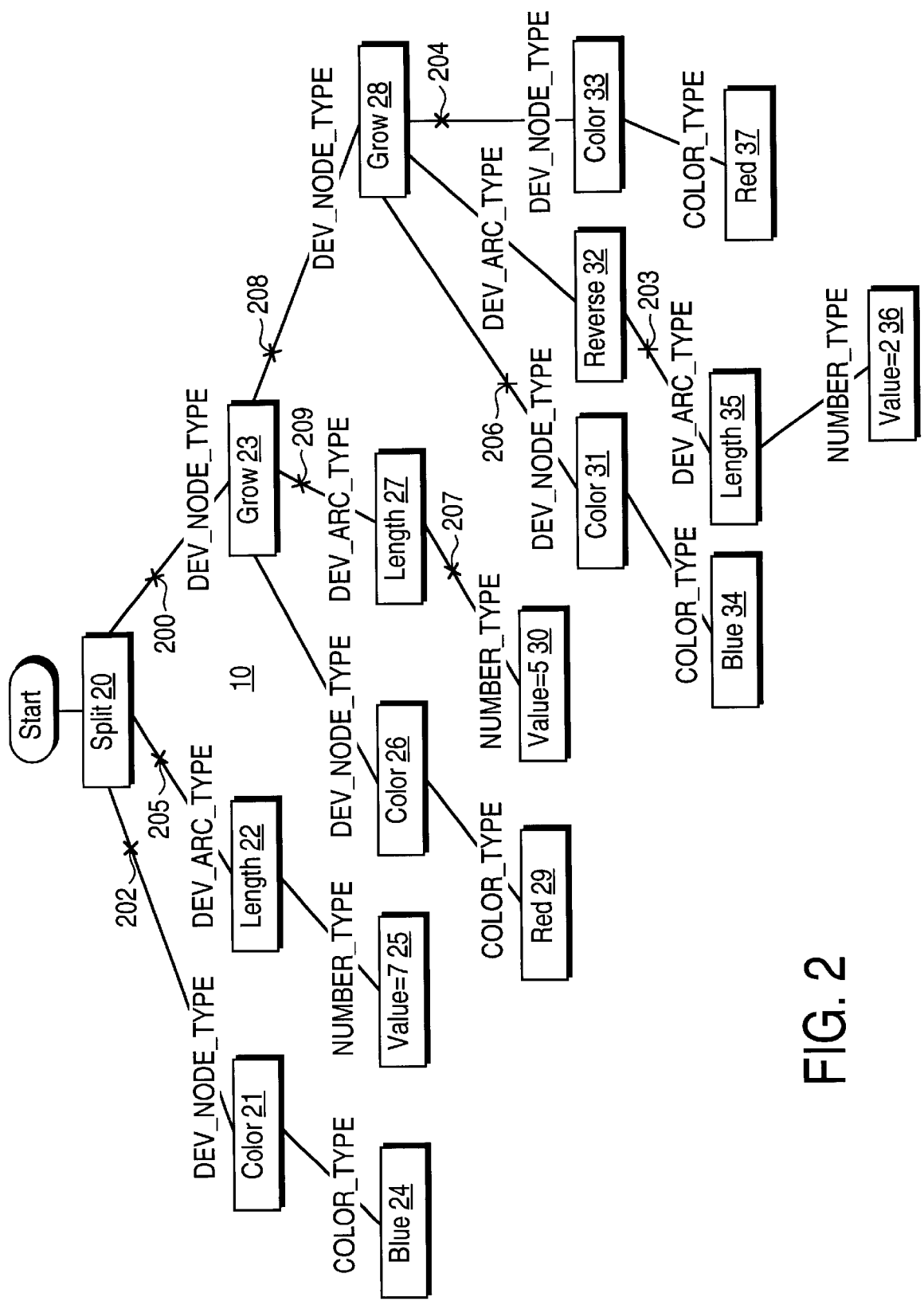
FIG. 2 shows a tree which defines a program for generating a graph using cellular encoding with typed development operators.

FIG. 2 shows a tree 10 which defines a program for generating a graph using cellular encoding with typed development operators. The tree 10 includes an arrangement of operator blocks 20–37 each of which holds a typed development operator. The tree 10 is generated so that the parent-child interconnections among the operator blocks 20–37 match the basic types associated with the development operators contained in the operator blocks 20–37.

The operator block 20 holds the SPLIT operator and has three children which are the COLOR operator of DEV_NODE TYPE in the operator block 21, the LENGTH operator of DEV_ARC TYPE in the operator block 22, and the GROW operator of DEV NODE TYPE in the operator block 23. Other legal operators for the operator block 21 include the SPLIT and COLOR operators each of which is of DEV_NODE_TYPE. Another legal operator for the operator block 22 is the REVERSE operator which is of DEV_ARC_TYPE. Other legal operators for the operator block 23 include the COLOR and SPLIT operators which are of DEV_NODE_TYPE.

Examples of illegal operators for the operator blocks 21 and 23 include the REVERSE, LENGTH, and VALUE= operators. Examples of illegal operators for the operator block 22 include the SPLIT, GROW, and COLOR operators.

The GROW operator in the operator block 23 has three children which are the COLOR operator of DEV_NODE_TYPE in the operator block 26, the LENGTH operator of DEV_ARC_TYPE in the operator block 27, and the GROW operator of DEV_NODE_TYPE in the operator block 28. The GROW operator in the operator block 28 has three children which are the COLOR operator of DEV_NODE_TYPE in the operator block 31, the REVERSE operator of DEV_ARC_TYPE in the operator block 32, and the COLOR operator of DEV_NODE TYPE in the operator block 33. The operator blocks 22, 27, and 35 hold LENGTH operators and have the child operator blocks 25, 30, and 36, respectively, which hold the VALUE=x operator of NUMBER_TYPE.

The operator blocks 21, 26, 31, and 33 hold COLOR operators and have the child operator blocks 24, 29, 34, and 37 which hold the BLUE, RED, BLUE and RED operators, respectively, of basic type COLOR_TYPE. The operator block 32 holds a REVERSE operator and has the child operator block 35 which holds the LENGTH operator of DEV_ARC_TYPE. Another legal operator for the operator block 35 is the REVERSE operator which is also of DEV_ARC_TYPE.

Figure 3:
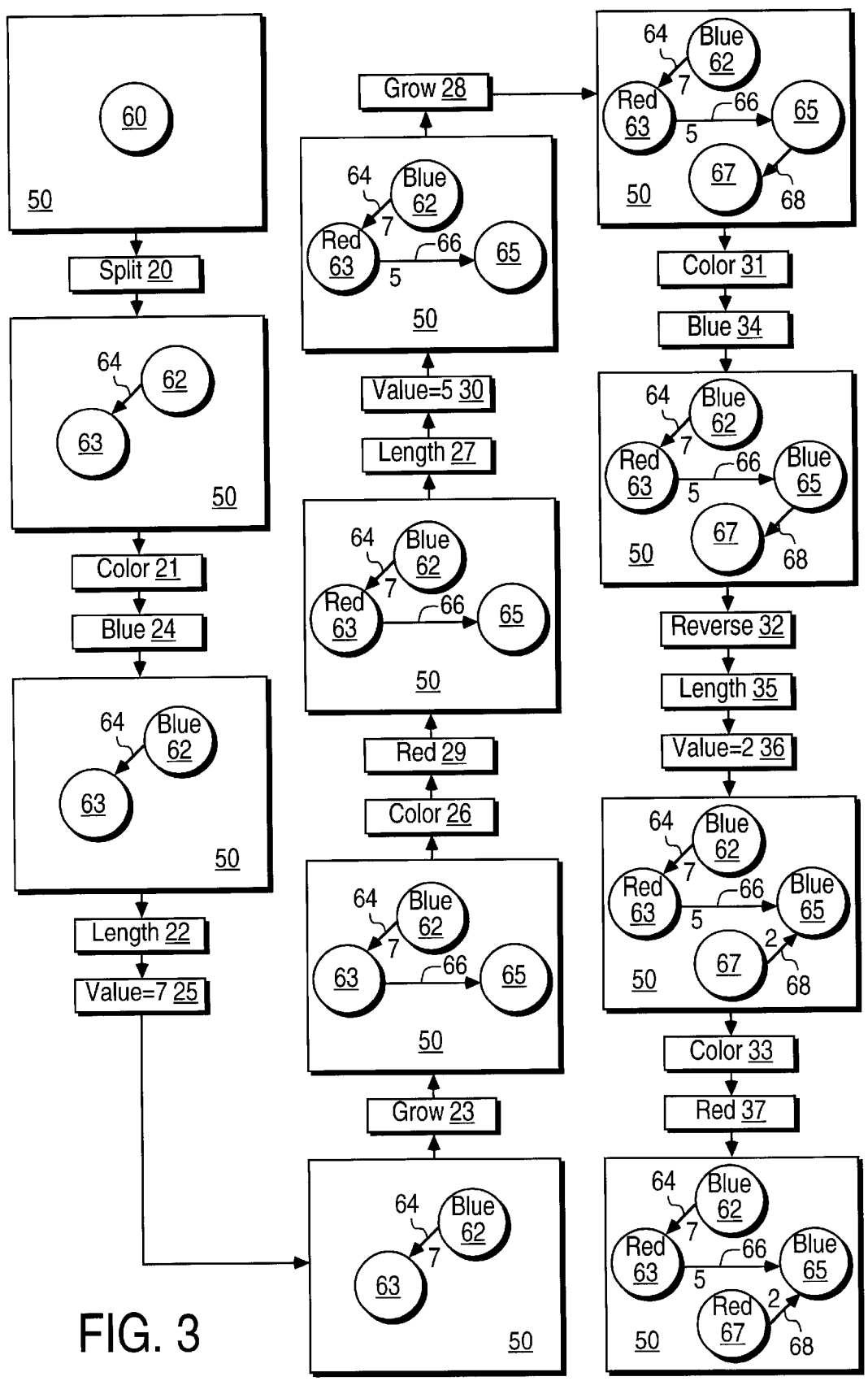
FIG. 3 illustrates the development of a graph from an embryo node by the application of development operators in a tree.

FIG. 3 illustrates the development of a graph 50 from an embryo node 60 by the application of the typed development operators in the tree 10. At the start of the tree 10, the graph 50 consists of the node 60 as an embryonic structure.

The SPLIT operator in block 20 creates a pair of nodes 62–63 with an arc 64 in between. The node 62 has all of the inputs of the node 60 and the node 63 has all of the outputs of the node 60. The first child of the SPLIT operator in block 20 is applied to the node 62, the second child of the SPLIT operator in block 20 is applied to the arc 64, and the third child of the SPLIT operator in block 20 is applied the node 63. The COLOR operator in block 21 is the first child of the SPLIT operator in block 20. The COLOR operator in block 21 and its child BLUE operator in block 24 set the color of the node 62 to blue. The LENGTH operator in block 22 is the second child of the SPLIT operator in block 20. The LENGTH operator in block 22 and its child VALUE= operator in block 25 set the length of the arc 64 to 7. The GROW operator in block 23 is the third child of the SPLIT operator in block 20. The GROW operator in block 23 further develops the node 63.

The GROW operator in block 23 creates a node 65 from the node 63 with an arc 66 in between. The first child of the GROW operator in block 23, the COLOR operator in block 26 along with its child RED operator in block 29 set the color of the node 63 to red. The second child of the GROW operator in block 23, the LENGTH operator in block 27, and its child VALUE=operator in block 30 set the length of the arc 66 to 5.

The GROW operator in block 28, the third child of the GROW operator block 23, creates a node 67 from the node 65 with an arc 68 in between. The COLOR operator in block 31, the first child of the GROW operator in block 28, and its child BLUE operator in block 34 set the color of the node 65 to blue. The REVERSE operator in block 32, the second child of the GROW operator in block 28, and its descendant LENGTH and VALUE=operators in blocks 35 and 36 reverse the direction of the arc 68 and set its length to 2. The COLOR operator in block 33, the third child of the GROW operator in block 28, and its child RED parameter in block 37 set the color of the node 67 to red.

Figure 4:
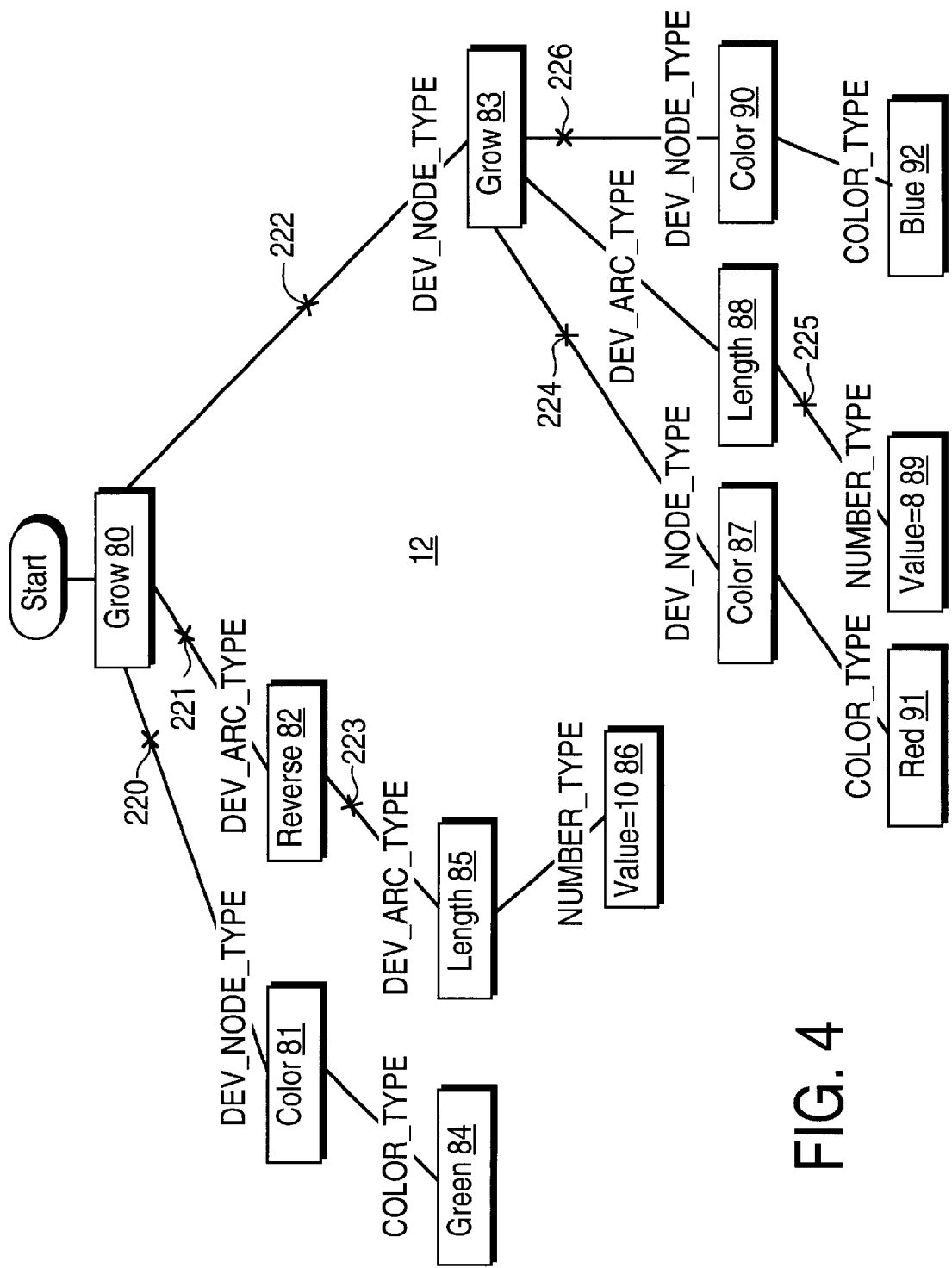
FIG. 4 shows another tree which defines a program for generating a graph using cellular encoding with typed development operators.

FIG. 4 shows a tree 12 which defines another program for generating a graph using cellular encoding with typed development operators. The tree 12 includes a set of operator blocks 80–90 which maintain the basic type matching set forth above. For example, the operator block 80 holds the GROW operator and has three typed child operators in blocks 81–83. The blocks 81–83 hold COLOR, REVERSE, and GROW operators which are typed as DEV_NODE_TYPE, DEV_ARC_TYPE, and DEV_NODE_TYPE, respectively, as required by the GROW operator in operator block 80. The remaining operators in blocks 81–90 also maintain correct basic type matching between parents and children.

Figure 5:
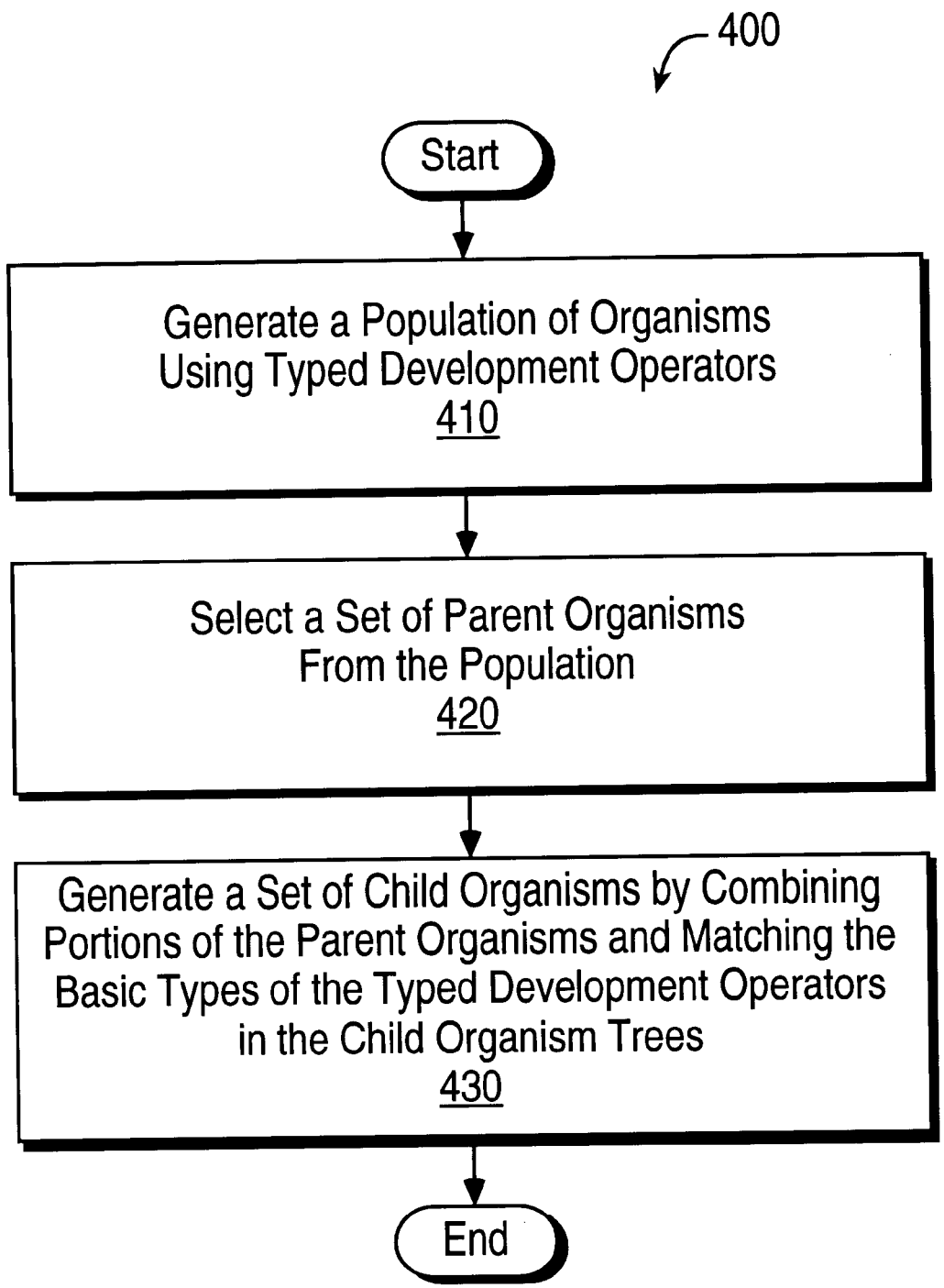
FIG. 5 illustrates a method for evolving a structure using cellular encoding with typed development operators.

FIG. 5 illustrates a method 400 for evolving a structure using cellular encoding with typed development operators. At step 410, a population of organisms with typed development operators is generated in accordance with the method 300.

At step 420, a set of parent organisms is selected from the population generated at step 410. The parent organism are selected based on the fitness of the parent organisms in generating the structure. The fitness may be based a fitness measure which is determined using known techniques. For example, an electrical circuit structure developed by a parent organism may be evaluated by a circuit analysis program to determine its fitness in performing a desired circuit function.

At step 430, a set of child organisms is generated by combining portions of the parent organisms such that the connections among the development operators in each child organism tree have matching types. The child organisms may provide a population for a subsequent iteration of the method 400.

Steps 420–430 are repeated through as many iterations as are necessary to generate an organism that yields a structure having the desired fitness for solving a particular problem. The combining performed at step 430 my include mutation of individual trees or the cutting and combining of portions of different trees which may be referred to as crossover.

For example, the tree 12 along with the tree 10 may each be a putative solution for the problem of developing a graph. The trees 10–12 may be organisms in an initial population or may be organisms that are generated during any iteration of the method 400. In either case, the trees 10–12 are selected as parents at step 420.

Figure 6:
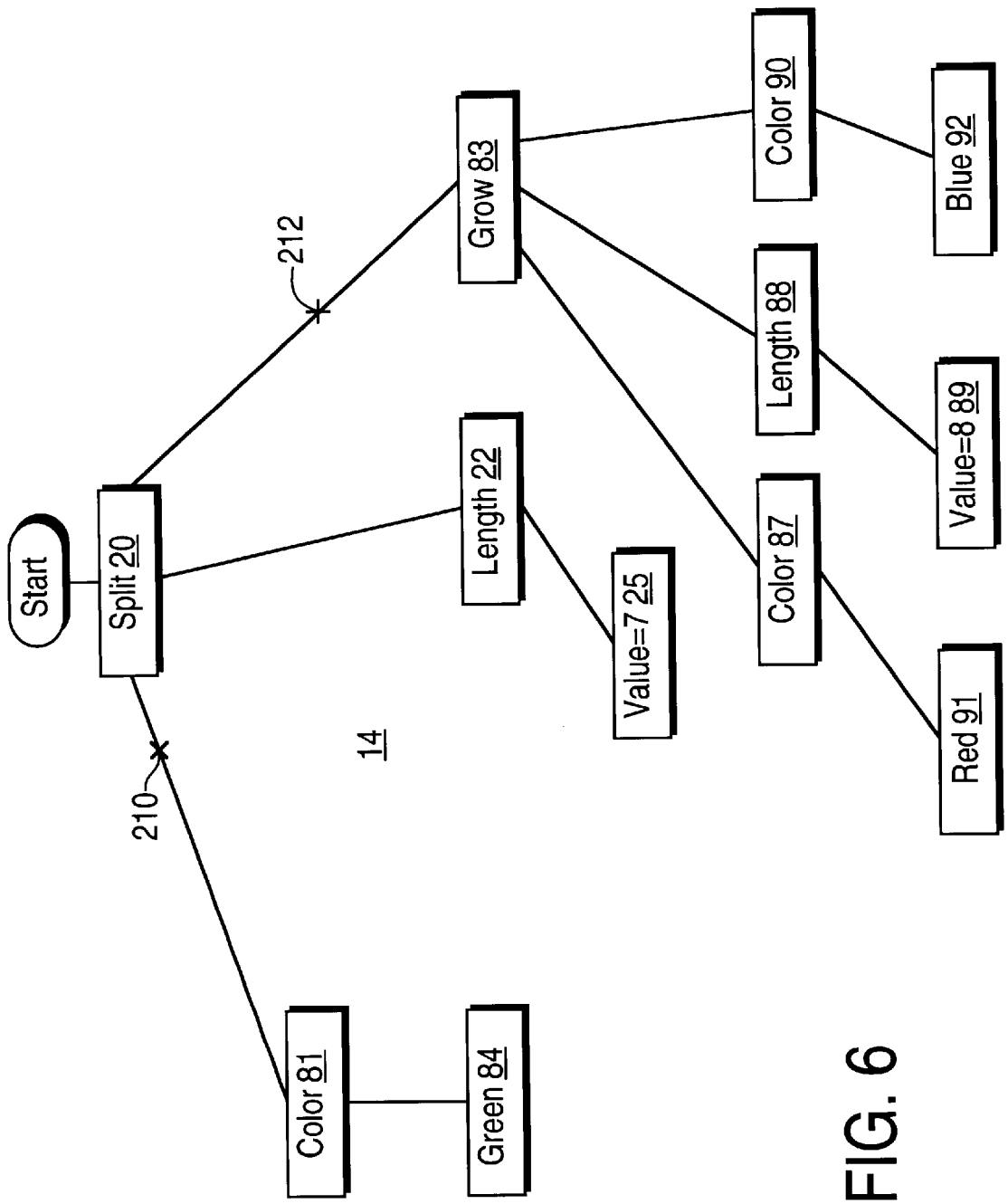
FIG. 6 shows a child tree which is generated by combining a pair of parent trees.

FIG. 6 shows a child tree 14 which is generated at step 430 by combining the trees 10 and 12. The child tree 14 is formed by cutting the tree 10 at points 200 and 202 and moving the operator blocks 20, 22, and 25 as a tree branch to the child tree 14. The tree 12 is cut at point 220 and the tree branch of the operator blocks 81 and 84 are spliced onto the child tree 14 at point 210. The tree 12 is also cut at point 222 and the tree branch of the operator blocks 83, and 8–92 are spliced onto the child tree 14 at point 212.

The splices at the points 210 and 212 are selected to match the DEV_NODE_TYPE required for the first and third children of the SPLIT operator in block 20. Other tree branches that may be spliced onto the points 210 and 212 of the child tree 14 include tree branches cut at points 204, 206, and 208 from the tree 10 and tree branches cut at points 220, 224, and 226 from the tree 12. All of these cuts provide the DEV_NODE_TYPE needed at cut points 210 and 212. This is in contrast to prior cellular encoding methods in which tree branches are cut from parent trees and spliced onto child trees without regard to the nature of the operators in the trees.

Examples of tree branches that cannot be spliced onto points 210 and 212 of the child tree 14 under the rules for the present typed cellular encoding methods include tree branches cut at points 203, 205, and 207 from the tree 10 and tree branches cut at points 221, 223, and 225 from the tree 12. None of these cuts provide the DEV_NODE_TYPE needed at cut points 210 and 212 of the child tree 14.

Figure 7:
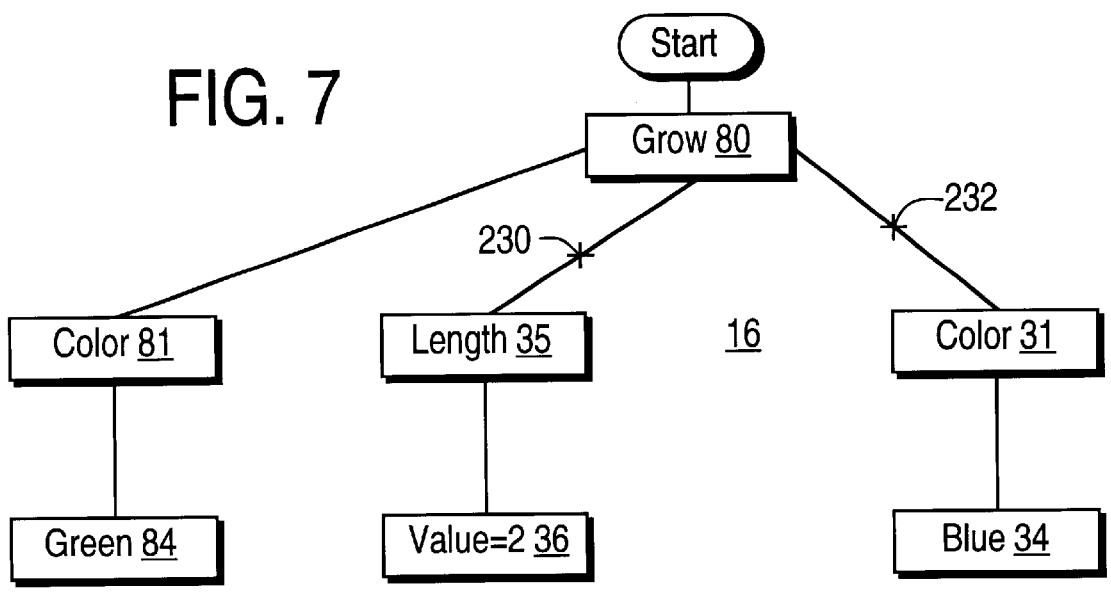
FIG. 7 shows another child tree which is generated by combining a pair of parent trees

FIG. 7 shows a child tree 16 which is generated at step 430 by combining the trees 10 and 12. The child tree 16 is formed by cutting the tree 12 at points 221 and 222 and moving the operator blocks 80, 81, and 84 as a tree branch to the child tree 16. The tree 10 is cut at point 203 and the tree branch of the operator blocks 35 and 36 from the tree 10 are spliced onto the child tree 16 at point 230. The tree 10 is also cut at point 206 and the tree branch of the operator blocks 31 and 34 from the tree 10 are spliced onto the child tree 16 at point 232.

The splices at the points 230 and 232 are selected to match the DEV_ARC_TYPE required at point 230 and the DEV_NODE_TYPE required at point 232 by the GROW operator block 80. Other tree branches that may be spliced onto point 230 of the child tree 16 according to the present techniques include tree branches cut at points 203, 205, and 209 from the tree 10 and tree branches cut at points 221 and 223 from the tree 12 each of which provides the DEV_ARC_TYPE. Other tree branches that may be spliced onto the point 232 of the child tree 16 include tree branches cut at points 200, 202, 204, 206, and 208 from the tree 10 and tree branches cut at points 220, 222, 224, and 226 from the tree 12. All of these cuts provide the DEV NODE TYPE needed at cut point 232.

Examples of tree branches that cannot be spliced onto point 232 of the child tree 16 according to the present typed cellular encoding techniques include tree branches cut at points 203, 205, and 207 from the tree 10 and tree branches cut at points 221, 223, and 225 from the tree. 12. Examples of tree branches that cannot be spliced onto point 230 of the child tree 16 according to the present techniques include tree branches cut at points 200, 202, 204, 206, and 208 from the tree 10 and tree branches cut at points 220, 222, 224, and 226 from the tree 12.

Although the above examples show multiple cuts made to a parent tree, these cellular encoding with matching typed development operator techniques may readily be adapted to methods which make only a single cut to a parent tree when creating child organism.

The typed development operators discussed above may be arranged in a hierarchy of basic types and sub types. The matching of the sub types of development operators is contravariant. This means that a sub type matches at or below its level in the hierarchy. Consider an example hierarchy which includes a component type, a wire type which is a sub type of the component type, and a resistor type and a capacitor type which are sub types of the wire type. An element of capacitor type may be legally acted upon by developers of the capacitor type or the wire type or the component type but not by any development operators lower in the hierarchy than the capacitor type or the resistor type.

In addition, typed parameters may be arranged in a hierarchy of types and sub types. The matching of the sub types of parameters is covariant. This means that a sub type matches at or above its level in the hierarchy. Consider an example hierarchy which includes a number type, a real type and a complex type which are sub types of the number type, and an integer type which is a sub type of the real type. A parameter of the integer type may be legally provided as an argument to development operators having inputs typed for the real type or the complex type.

The elements of a structure being developed using the present techniques may be viewed as undergoing a sequence of development phases. In general, these development phases must proceed in some predetermined order to ensure that a legal structure is developed. In general, there may be any number of such ordered development phases. The typed development operators disclosed herein may be used to ensure that phase ordering is not violated when constructing organisms. For example, phase n operators may not legally be spliced onto a sub tree at a point at which an element has already reached development phase n+1 or higher.

In the graph development example above, nodes are in phase one when their structure is being developed by the SPLIT and GROW operators. Once structural development is complete a node transitions to phase two using the COLOR operator where labeling is applied. A phase one operator such as GROW may not legally be applied to a node once it has entered phase two of development. Typed development operators provide a means of ensuring that phase one operators are not spliced onto a sub tree at a point at which a node has already reached development phase two.

Figure 8:
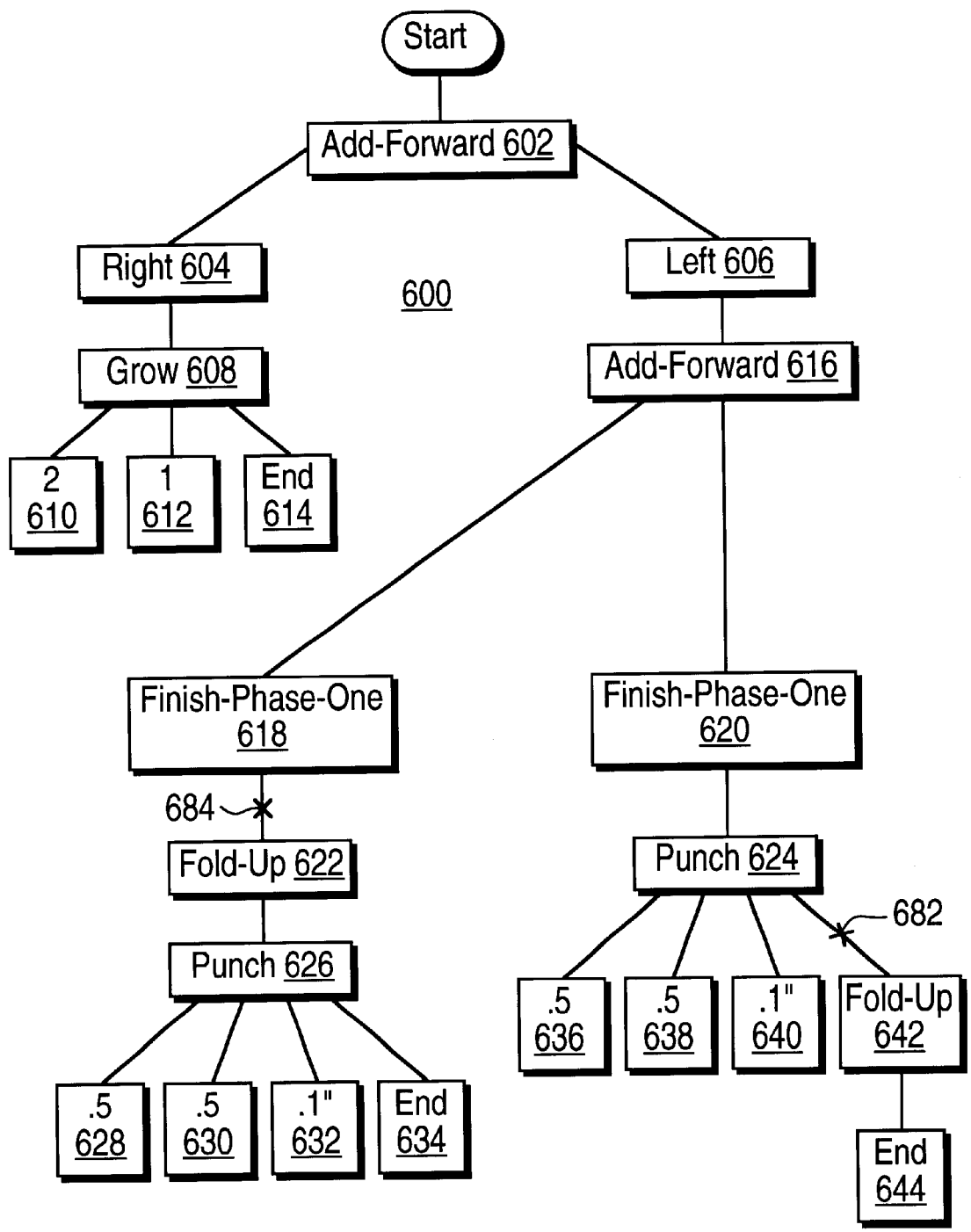
FIG. 8 shows a tree which defines a program for generating a sheet metal part using cellular encoding with typed development operators.
Figure 9:
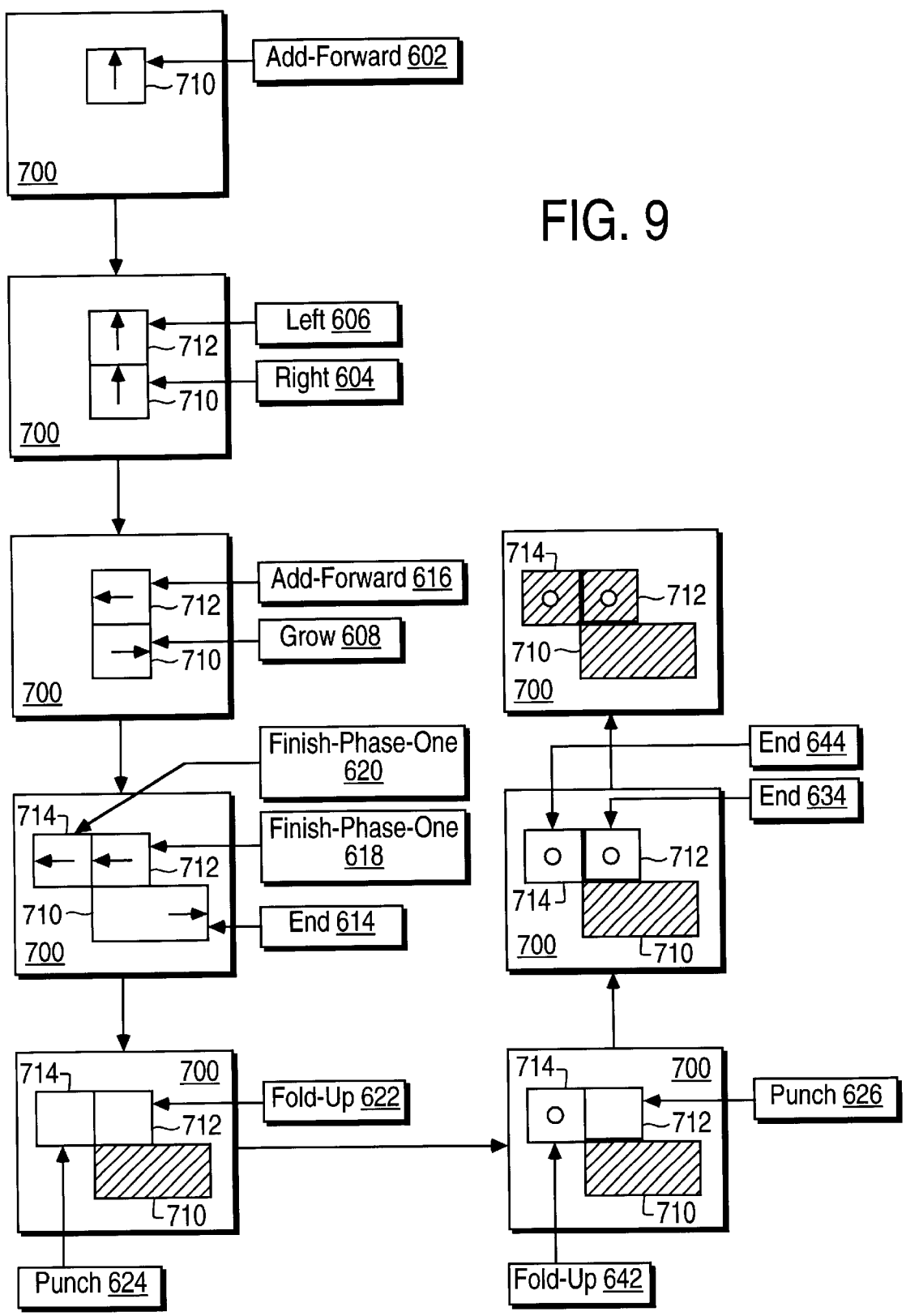
FIG. 9 illustrates the development of a sheet metal part from an embryo panel by the application of the typed development operators in a tree.

FIGS. 8–9 show an example of two development phases in the design of a sheet metal part. The first development phase is to determine the overall shape as a configuration of panels. The second development phase is to determine for each panel its folds and the configuration of holes to be punched in it. The embryo structure is a 1-inch by 1-inch panel which of type PHASE_ONE_PANEL. One edge is considered the leading edge and is marked with an arrow in FIG. 9.

The operators which can apply to a PHASE_ONE_PANEL are typed DEV_PHASE_ONE_PANEL and are as follows.

A GROW operator takes a height-factor and a width-factor argument each of NUMBER_TYPE. The GROW operator multiples the size by its numeric arguments and passes further development to its developer child. For example, the result of applying the GROW 3 2 operator to the embryo panel is a 3-inch by 2-inch rectangle facing in the same direction, growing its height toward the arrow and its width equally to the left and right.

A LEFT operator and a RIGHT operator leave the sized of a panel unchanged but move the leading edge to the left or the right side, respectively, with the resulting panel further developed by the developer child operator. Since the arrow-moves, the height of the original panel becomes the width of the new panel for the purposes of further development.

An ADD-PANEL-FORWARD operator adds a new panel in the direction of the arrow. The first developer child continues to develop the original panel while the second developer child develops the new panel.

A FINISH-PHASE-ONE operators ends any further phase one development. The panel is now considered a PHASE_TWO_PANEL and development on it continues by the developer child.

In development phase two, the size of a panel and panel connection do not change but holes and scores for folding are added. The operators which can apply to a PHASE_TWO_PANEL are typed DEV_PHASE_TWO_PANEL and are as follows.

A FOLD-UP operator and a FOLD-DOWN operator score the boundary between the panel and the panel which spawned it either on the top or the bottom and continues development by the developer child.

A PUNCH operator takes a y and a d argument each of NUMBER_TYPE. The PUNCH operator adds a hole of the specified diameter d at the specified position as a fraction of the size and in the direction of the arrow and continues development by the developer child.

An END operator ends development.

The types PHASE_ONE_PANEL and PHASE_TWO_PANEL can be considered as sub types of the component type PANEL. If so, the END operator can be considered of type DEV_PANEL and by contravariant matching can be used anywhere either a phase one developer or a phase two developer is required.

FIG. 8 shows a tree 600 which defines a program for generating a sheet metal part using cellular encoding with typed development operators. The tree 600 includes an arrangement of blocks 602–644 that hold typed development operators and arguments. The tree 600 is generated in an initial population or created from parent organisms by observing the type matching rules for parent-child connections among the blocks 602–644 including typed phases. For example, the phase two development operator in block 642 cannot be cut at point 682 and spliced onto point 680 to the phase one development operator in block 602. Similarly, the phase two development operator in block 622 cannot be cut at point 684 and spliced onto point 680.

FIG. 9 illustrates the development of a sheet metal part 700 from an embryo panel 710 by the application of the typed development operators in the tree 600. At the start of the tree 600, the metal part 700 consists of the panel 710 as an embryonic structure. The ADD-FORWARD operator in block 602 applies to the panel 710 resulting in a panel 712. The LEFT operator 606 applies to the panel 712 and the-RIGHT operator 604 applies to the panel 710. The application of the remaining development operators in the tree 600 are similarly illustrated.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for cellular encoding, comprising the steps of:

determining a set of basic types for a set of components of a structure that performs a desired function;

associating each of a set of development operators for developing the structure with one or more of the basic types;

generating an organism for developing the structure wherein the organism has a tree arrangement of the development operators by matching the basic types associated with connections among the development operators in the tree.

2. The method of claim 1, wherein the step of determining a set of basic types comprises the step of determining a set of basic component types for the structure.

3. The method of claim 2, wherein the step of associating each of a set of development operators for developing the structure with one or more of the basic types comprises the step of associating one or more of the development operators with a hierarchy of the basic component types.

4. The method of claim 3, wherein the development operators include a development operator having at least one output which is associated with one of the basic component types and wherein the organism is generated such that a child development operator in the tree connected to the output matches the basic component type associated with the output or one of the basic component types higher in the hierarchy than the basic component type associated with the output.

5. The method of claim 1, wherein the step of determining a set of basic types comprises the step of determining a set of basic parameter types for the components of the structure.

6. The method of claim 5, wherein the step of associating each of a set of development operators for developing the structure with one or more of the basic types comprises the step of associating one or more of the development operators to a hierarchy of the basic parameter types.

7. The method of claim 6, wherein the development operators include a development operator having at least one input for a parameter which is associated with one of the basic parameter types and wherein the organism is generated such that a child development operator in the tree connected to the input matches the basic parameter type of the input or a basic parameter type lower in the hierarchy than the basic parameter type of the input.

8. The method of claim 1, further comprising the steps of:

generating a population of organisms each having a tree arrangement of the development operators by matching the basic types associated with connections among the development operators in each tree;

selecting a set of parent organisms from the population of organisms;

generating a set of child organisms by combining portions of the parent organisms such that the basic types associated with connections among the development operators in the child organisms match.

9. The method of claim 8, wherein the step of selecting a set of parent organisms comprises the step of selecting a set of parent organisms based on a fitness of a set of structures generated by the organisms.

10. The method of claim 8, wherein the step of generating a set of child organisms by combining portions of the parent organisms includes the steps of:

cutting a tree branch from a first one of the parent organisms;

cutting a second one of the parent organisms at a particular point;

splicing the tree branch from the first one of the parent organisms onto the second one of the parent organisms at the particular point if the basic type associated with a development operator in the tree branch at the particular point matches the basic type associated with a development operator in the second parent organism at the particular point.

11. The method of claim 10, wherein the step of splicing the tree branch from the first one of the parent organisms onto the second one of the parent organisms comprises the step of splicing the tree branch from the first one of the parent organisms onto the second one of the parent organisms at the particular point if a development phase associated with the development operator in the tree branch at the particular point is appropriate to a development phase associated with the development operator in the second parent organism at the particular point.

12. The method of claim 1, further comprising the step of determining a set of development phases for one or more of the basic types.

13. The method of claim 12, wherein the step of generating a set of child organisms by combining portions of the parent organisms such that the basic types associated with connections among the development operators in the child organisms match comprises the step of generating a set of child organisms by combining portions of the parent organisms such that the basic types and the development phases associated with connections among the development operators in the child organisms match.

\* \* \* \* \*